(12) United States Patent
Ono et al.

(10) Patent No.: US 8,910,668 B2
(45) Date of Patent: Dec. 16, 2014

(54) HOSE FOR TRANSPORTING FLUIDS

(75) Inventors: Shunichi Ono, Kanagawa (JP); Satoshi Shimanoe, Kanagawa (JP); Naoyuki Ooka, Kanagawa (JP)

(73) Assignee: The Yokohama Rubber Co., Ltd. (JP)

( * ) Notice: Subject to any disclaimer, the term of this patent is extended or adjusted under 35 U.S.C. 154(b) by 171 days.

(21) Appl. No.: 13/517,185

(22) PCT Filed: Dec. 19, 2009

(86) PCT No.: PCT/JP2009/071188
§ 371 (c)(1),
(2), (4) Date: Jun. 19, 2012

(87) PCT Pub. No.: WO2011/074126
PCT Pub. Date: Jun. 23, 2011

(65) Prior Publication Data
US 2012/0261018 A1  Oct. 18, 2012

(51) Int. Cl.
| F16L 11/00 | (2006.01) |
| F16L 9/00 | (2006.01) |
| F16L 11/08 | (2006.01) |
| G01M 3/36 | (2006.01) |

(52) U.S. Cl.
CPC .............. *F16L 11/08* (2013.01); *F16L 2201/60* (2013.01); *F16L 2201/30* (2013.01); *G01M 3/36* (2013.01)
USPC ............ 138/126; 138/128; 138/137; 138/174

(58) Field of Classification Search
CPC .... F16L 11/08; F16L 2201/30; F16L 2201/60
USPC ................................................. 138/126, 137
See application file for complete search history.

(56) References Cited

U.S. PATENT DOCUMENTS

| 4,465,105 A | 8/1984 | Slater |
| 5,244,016 A | 9/1993 | Kuroda et al. |
| 5,427,155 A | 6/1995 | Williams |
| 5,518,034 A | 5/1996 | Ragout et al. |

FOREIGN PATENT DOCUMENTS

| GB | 2274498 | 7/1994 |
| JP | 58-174784 | 10/1983 |
| JP | H05-272678 | 10/1993 |
| JP | H07-012270 | 1/1995 |

(Continued)

OTHER PUBLICATIONS

PCT/JP2009/071188; Search Report; dated Mar. 4, 2010.

(Continued)

*Primary Examiner* — Paul R Durand
*Assistant Examiner* — Vishal Pancholi
(74) *Attorney, Agent, or Firm* — Thorpe North & Western LLP

(57) ABSTRACT

A hose for transporting fluids in which a plurality of carcass layers is disposed between an inner surface rubber layer and a cover rubber layer, and a visible design, continuous in a hose axial direction, is provided on an outer surface of the cover rubber layer. The hose for transporting fluids includes a sliding-surface layer that is embedded at least partially in the hose axial direction in the cover rubber layer and that is non-adhesive with respect to the cover rubber layer, and a constraining layer that is embedded so as to be wound partially in a hose circumferential direction on an outer side of the sliding-surface layer and that is adhesive with respect to the cover rubber layer.

18 Claims, 11 Drawing Sheets

(56) References Cited

FOREIGN PATENT DOCUMENTS

| | | |
|---|---|---|
| JP | H09-119584 | 5/1997 |
| JP | 2000-179755 | 6/2000 |
| JP | 2001-090873 | 4/2001 |
| JP | 2001-187986 | 7/2001 |
| JP | 2009-287695 | 12/2009 |

OTHER PUBLICATIONS

Extended European search report dated Jul. 19, 2103, 7 pages, Germany.

HOSE FOR TRANSPORTING FLUIDS

TECHNICAL FIELD

The present invention relates to a hose for transporting fluids, and particularly relates to a hose for transporting fluids configured so that failures of a reinforcing layer provided therein can be detected in a large diameter hose for transporting fluids used in water, such as a marine hose.

BACKGROUND

With large diameter hoses for transporting fluids exemplified by marine hoses, fluids such as oil and the like are transported at high pressures and it is necessary to strictly prevent these fluids from leaking out of the hose. Therefore, with this type of fluid transport hose, efforts to enhance pressure capacity have been carried out by disposing a plurality of layers of reinforcing layers formed from organic fiber cords as a reinforcing layer on an outer side of an inner surface rubber layer having corrosion resistance with respect to fluids. While there is no possibility of a fluid immediately leaking out of the hose in the case of a partial failure of these reinforcing layers, in consideration of safety, hoses are replaced early, at a stage of initial failure of a portion of the reinforcing layers. Thus, conventionally, multiple detection means have been proposed by which leakage, accompanying failure of the reinforcing layer, of a fluid within a hose can be detected from the outside.

For example, Japanese Unexamined Patent Application Publication Nos. H05-272678A and 2001-90873A propose a hose including a reinforcing layer formed from a main pressure cord layer and an auxiliary pressure cord layer disposed on an outer side of the main pressure cord layer. The auxiliary pressure cord layer is configured so that organic fiber cords are wrapped asymmetrically with respect to a hose axial direction, resulting in a configuration by which the entire hose is twisted and deformed by the auxiliary pressure cord layer due to pressure of a fluid that has leaked internally due to a failure of the main pressure cord layer. Thus, a failure of the reinforcing layer can be externally visually recognized due to said twisting and deforming.

SUMMARY OF THE INVENTION

Problem to be Solved by the Invention

However, with the hose described above, the structure of the auxiliary pressure cord layer is complicated, leading to problems such as an increase in manufacturing costs of the hose, an increase in hose weight, and a reduction in hose flexibility.

An object of the present invention is to provide a hose for transporting fluids, configured so that leakage, accompanying failure of a reinforcing layer, of a fluid within the hose can be easily externally detected without complicating the structure of the reinforcing layer.

Means of Solving the Problem

A hose for transporting fluids of the present invention that achieves the object described above is a hose for transporting fluids in which a plurality of reinforcing layers is disposed between an inner surface rubber layer and a cover rubber layer, and a visible design, continuous in a hose axial direction, is provided on an outer surface of the cover rubber layer. Such a hose for transporting fluids includes a sliding-surface layer that is embedded at least partially in the hose axial direction in the cover rubber layer and that is non-adhesive with respect to the cover rubber layer, and a constraining layer that is embedded so as to be wound partially in a hose circumferential direction on an outer side of the sliding-surface layer and that is adhesive with respect to the cover rubber layer.

The constraining layer is preferably embedded so as to be wound within a range of ⅓ or more and ½ or less of a length of an entire circumference of the hose. Additionally, a plurality of the constraining layers is preferably disposed intermittently in the hose axial direction and winding positions in the hose circumferential direction of the constraining layers are preferably configured so that adjacent constraining layers are on sides opposite each other in the hose circumferential direction.

Alternatively, the constraining layer is preferably wound in a spiral manner, or is preferably disposed so that the constraining layers are bisected in a longitudinal direction and are symmetrical to each other around a hose center.

The sliding-surface layer is preferably formed from a polyester film and the constraining layer is preferably formed from a plurality of organic fiber cords aligned in the hose circumferential direction. The hose for transporting fluids of the present invention can be suitably used as a marine hose for transporting oil.

Effect of the Invention

According to the hose for transporting fluids of the present invention, the sliding-surface layer is embedded at least partially in the hose axial direction in the cover rubber layer and is non-adhesive with respect to the cover rubber layer; and the constraining layer is embedded so as to be wound partially in the hose circumferential direction on the outer side of the sliding-surface layer and is adhesive with respect to the cover rubber layer. Therefore, when the reinforcing layer fails, the cover rubber layer swells due to pressure of the leaked fluid and, meanwhile, deformation in the hose circumferential direction is constricted by the constraining layer at a portion of the cover rubber layer around the constraining layer. Moreover, the cover rubber layer slides on the sliding-surface layer and, therefore, does not follow said swelling.

As a result, twisting deformation of the cover rubber layer occurs, and this twisting deformation leads to the deformation of a portion of the design provided on the outer surface. Therefore, external visual detection of fluid leakage can be carried out easily. Additionally, the structure of the reinforcing layer is not complicated because a reinforcing layer having a conventional structure can be used.

BRIEF DESCRIPTION OF THE DRAWINGS

FIG. 5A illustrates a normal state and FIG. 5B illustrates a state where fluid leakage has occurred.

FIG. 8A illustrates a normal state and FIG. 8B illustrates a state where fluid leakage has occurred.

FIG. 3A illustrates a normal state and FIG. 3B illustrates a state where fluid leakage has occurred.

DETAILED DESCRIPTION

Figure 1:
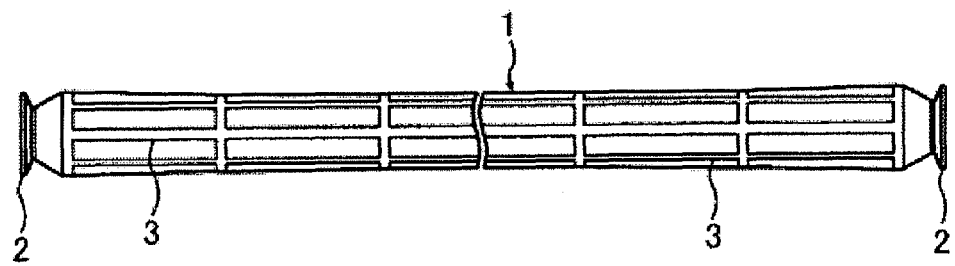
FIG. 1 is an appearance drawing illustrating a hose for transporting fluids according to a first embodiment of the present invention.

Next, embodiments of the present invention will be described while referring to the drawings.

FIG. 1 illustrates a hose for transporting fluids according to a first embodiment of the present invention.

With this hose for transporting fluids, a splicing fitting 2 is attached in a fluid tight manner to each end portion of a hose body 1 and a design 3 that is continuous in a hose axial direction is provided on an outer surface of the hose body 1. Normally, the design 3 is colored white, orange, or the like so that external recognition can be carried out easily.

Figure 2:
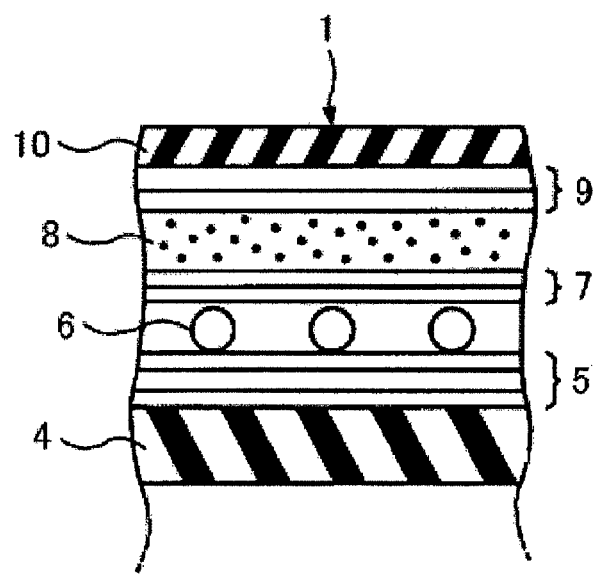
FIG. 2 is a partial cross-sectional view illustrating a structure of the hose for transporting fluids depicted in FIG. 1.

As illustrated in FIG. 2, a structure of the hose body 1 is configured such that a first inner side carcass layer 5, a spiral wire reinforcing layer 6, a second inner side carcass layer 7, a buffer layer 8, an outer side carcass layer 9, and a cover rubber layer 10 are sequentially laminated on a periphery of a cylindrical inner surface rubber layer 4. A plurality of reinforcing layers is formed from the first inner side carcass layer 5, the spiral wire reinforcing layer 6, the second inner side carcass layer 7, and the outer side carcass layer 9.

The inner surface rubber layer 4 is formed from a material having superior corrosion resistance with respect to fluids that flow in the hose.

The first inner side carcass layer 5 and the second inner side carcass layer 7 are formed by laminating a plurality of layers formed from organic fiber cords biased in the hose axial direction so that cords of adjacent layers cross each other; and a portion of these layers is turned back at an end of the hose body 1. The inner side carcass layers 5 and 7 mainly impart strength in the axial direction and suitable flexibility to the hose body 1.

The spiral wire reinforcing layer 6 is formed by spirally winding metal wire on a periphery of the first inner side carcass layer 5 at a predetermined pitch, and mainly imparts strength in the circumferential direction to the hose body 1. Moreover, the spiral wire reinforcing layer 6 prevents the hose body 1 from kinking when flexed and, furthermore, prevents the hose body 1 from collapsing under an external pressure.

Similar to the inner side carcass layers 5 and 7, the outer side carcass layer 9 is formed by laminating a plurality of layers formed from organic fiber cords biased in the hose axial direction so that cords of adjacent layers cross each other.

The buffer layer 8 is formed mainly from a foam material and is disposed between the inner side carcass layers 5 and 7 and the outer side carcass layer 9. As a result, even if the inner side carcass layers 5 and 7 fails, the buffer layer 8 will absorb and alleviate the pressure so that the failure will not be propagated to the outer side carcass layer 9.

Note that a buoyant layer may be provided between the outer side carcass layer 9 and the cover rubber layer 10 in order to impart buoyancy to the hose body 1.

Figure 3:
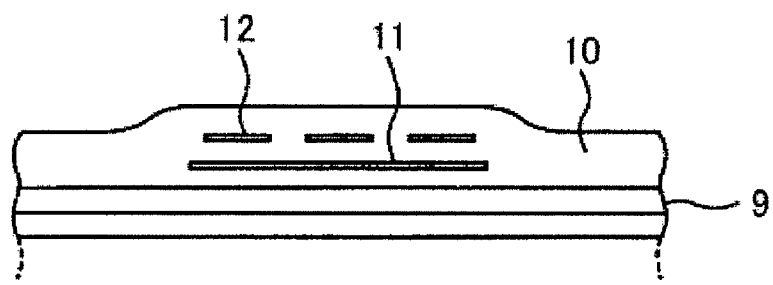
FIG. 3 is a partial cross-sectional view illustrating a configuration of a cover rubber layer in the first embodiment.
Figure 4:
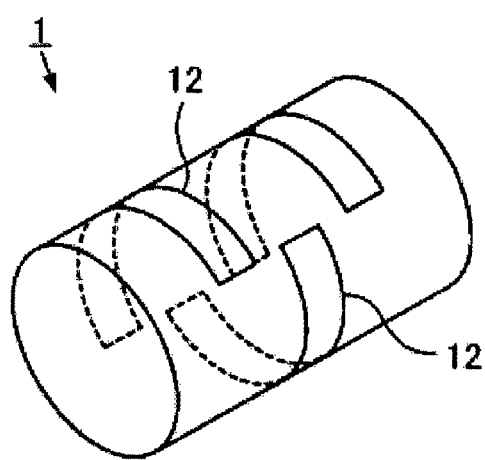
FIG. 4 is a perspective view illustrating a configuration of a constraining layer in the first embodiment.

In the configuration of the hose body 1 described above, as illustrated in FIG. 3, a sliding-surface layer 11 and a constraining layer 12 are embedded sequentially from the inner side of the cover rubber layer 10 partially in the hose circumferential direction. As illustrated in FIG. 4, the constraining layer 12 is embedded so as to be wound on an outer side of the sliding-surface layer 11 partially in the hose circumferential direction. The sliding-surface layer 11 is embedded in the cover rubber layer 10 at least partially in the hose axial direction, and has a size sufficient to cover a bottom surface of the constraining layer 12. Note that herein, "partially in the hose circumferential direction" refers to a state in which opposite ends in the longitudinal direction of the constraining layer 12 are not in contact with each other.

The sliding-surface layer 11 is formed from a material that does not melt, even at a vulcanization temperature of the cover rubber layer 10, and that is non-adhesive with respect to the cover rubber layer 10. For example, a polyester film can be used for the sliding-surface layer 11. The constraining layer 12 is formed from a material having ductility (elasticity) that is significantly lower than that of the cover rubber layer 10 and that is adhesive with respect to the cover rubber layer 10. For example, the constraining layer 12 can be formed from a plurality of organic fiber cords aligned in the hose circumferential direction. Preferable examples of the organic fiber include aramid fiber, polyketone or polyphenylene sulfide, and the like.

Figure 5A:
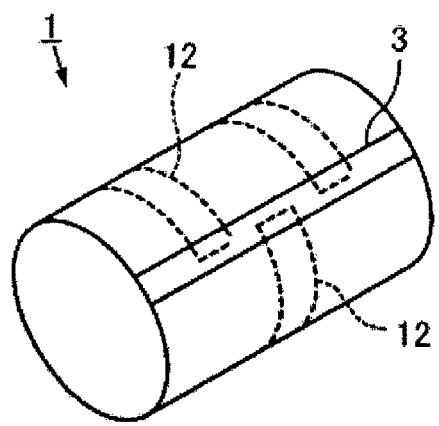
FIGS. 5A and 5B are perspective views illustrating deformation of a design due to twisting deformation of the cover rubber layer in the first embodiment.
Figure 5B:
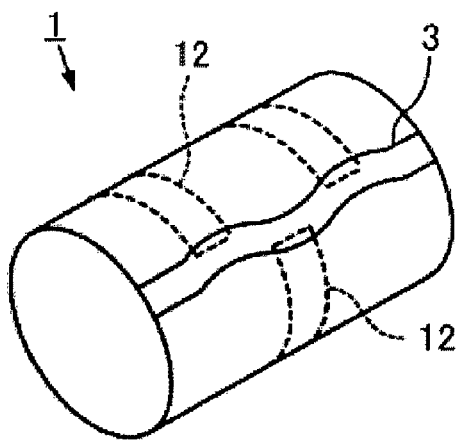

With such a configuration, in the hose body 1, when the inner side carcass layers 5 and 7 fail, the cover rubber layer 10 is caused to swell by the outer side carcass layer 9 due to the pressure of the fluid that leaks into the buffer layer 8. Meanwhile, deformation in the hose circumferential direction of a portion of the cover rubber layer 10 around the constraining layer 12 is constrained by the constraining layer 12; and, additionally, said portion of the cover rubber layer 10 slides on the sliding-surface layer 11 and, therefore, does not follow the swelling of the cover rubber layer 10. In contrast, deformation in the hose circumferential direction of portions separated from the constraining layer 12 in the cover rubber layer 10 is not constrained and said portions slide on the sliding-surface layer 11. Therefore said portions follow the swelling of the cover rubber layer 10. As a result, twisting deformation occurs in the cover rubber layer 10 due to a difference in amounts of deformation between the portion around the constraining layer 12 and the other portions, and a portion of the design 3 provided on the outer surface deforms from the normal state illustrated in FIG. 5A to a state of fluid leakage as illustrated in FIG. 5B due to this twisting deformation. Thereby, external visual detection of fluid leakage can be carried out easily. Note that in cases where the swelling of the cover rubber layer 10 is great and rapid, fluid leakage can also be detected by visual recognition of the failure of the cover rubber layer 10.

The constraining layer 12 is preferably embedded so as to be wound within a range of ⅓ or more and ½ or less of a length in the hose circumferential direction because the twisting deformation of the cover rubber layer 10 will be sufficient and the deformation of the design 3 will be large and easily recognized. Additionally, as illustrated in FIG. 3, a plurality of the constraining layers 12 is preferably disposed intermittently in the hose axial direction and winding positions in the hose circumferential direction of adjacent constraining layers 12 are preferably configured so as to be offset 180°, so as to be opposite each other in the hose circumferential direction. With such a configuration, the design 3 on the outer surface of the hose body 1 will weave and deform easily and, therefore, visual recognition of this deformation will be even easier.

Figure 6:
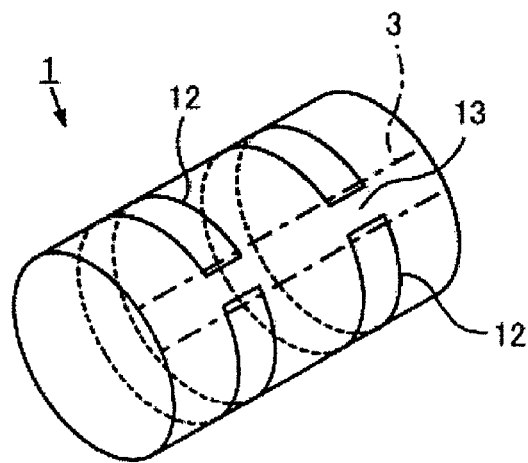
FIG. 6 is a perspective view illustrating an example of another configuration of a constraining layer in the first embodiment.

Note that in cases where the constraining layer 12 is wound on a large portion of the hose circumferential direction, as illustrated in FIG. 6, a portion 13 sandwiched by opposite ends of the constraining layer 12 is preferably configured so as to be in line with a hose longitudinal direction and at least a part of the design 3 is preferably configured to pass over this portion 13.

Figure 7:
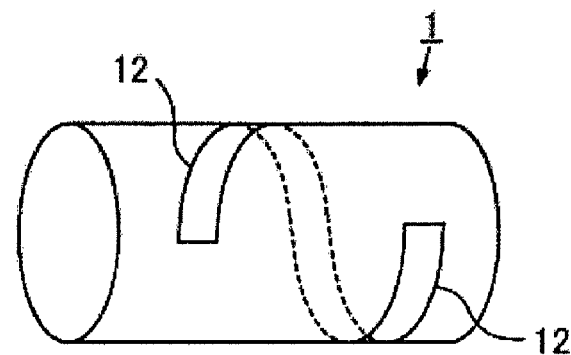
FIG. 7 is a three-dimensional view illustrating a configuration of a constraining layer in a second embodiment.

FIG. 7 illustrates the configuration of the constraining layer of the hose for transporting fluids according to a second embodiment of the present invention. Note that the form and structure of the hose body 1 is the same as that illustrated in FIGS. 1 and 2 and, therefore, description of such is omitted.

In the second embodiment, the constraining layer 12 is spirally wound. As a result of such a configuration, compared to the first embodiment, the amount of deformation of the design 3 with respect to the swelling of the cover rubber layer 10 can be increased, and the constraining layer 12 can be provided easier.

Figure 8A:
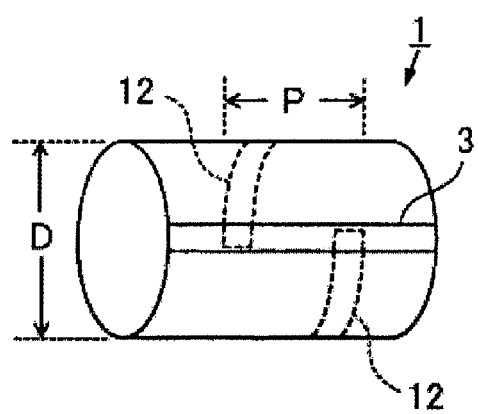
FIGS. 8A and 8B are three-dimensional views illustrating deformation of a design due to deformation of a cover rubber layer in the second embodiment.
Figure 8B:
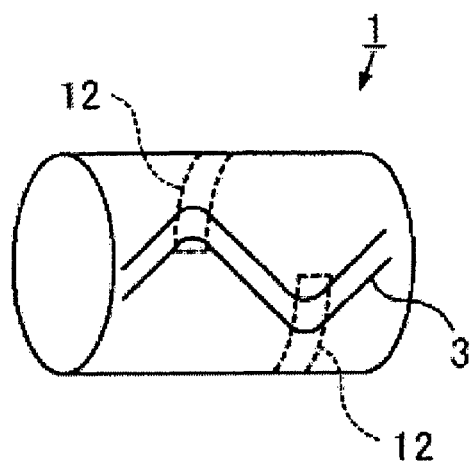

The number of times that the constraining layer 12 is wound in the hose circumferential direction is not particularly limited, but is preferably 1 to 2 times. If wound less than one time, the deformation of the design 3 will be reduced, and if wound more than two times, winding of the constraining layer 12 will be difficult. Additionally, a pitch of the spiral is not particularly limited and, for example, as illustrated in the normal state depicted in FIG. 8A, by configuring a pitch P to be $0.1 \times \pi D$ (where D is the hose external diameter), the design 3 can be made to deform greatly, inclining about 45°, even when the swelling of the cover rubber layer 10 is about 10% (external diameter ratio), as illustrated in the fluid leakage state depicted in FIG. 8B. Therefore, visual recognition can be facilitated. In cases where a plurality of the constraining layers 12 is provided in the hose axial direction, the deformation at an inclination of about 45° of the design 3 can be made continuous by configuring the size of the pitch between adjacent constraining layers 12 to be $0.2 \times \pi D$.

Figure 9:
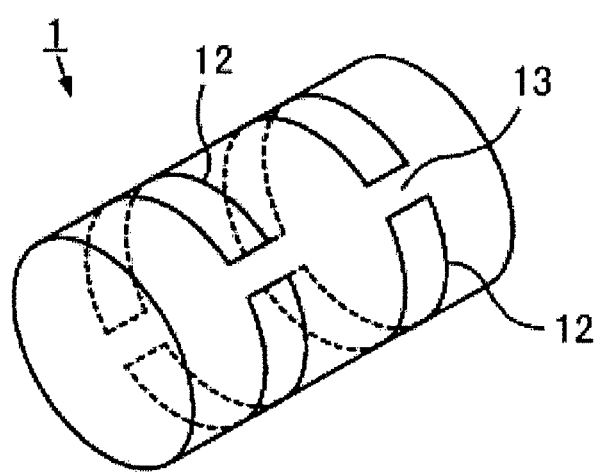
FIG. 9 is a perspective view illustrating a configuration of a constraining layer in a third embodiment.

FIG. 9 illustrates the configuration of the constraining layer of the hose for transporting fluids according to a third embodiment of the present invention. Note that the form and structure of the hose body 1 is the same as that illustrated in FIGS. 1 and 2 and, therefore, description of such is omitted.

In the third embodiment, the constraining layers 12 that are bisected in the longitudinal direction are disposed so as to be symmetrical around a hose center.

Figure 10A:
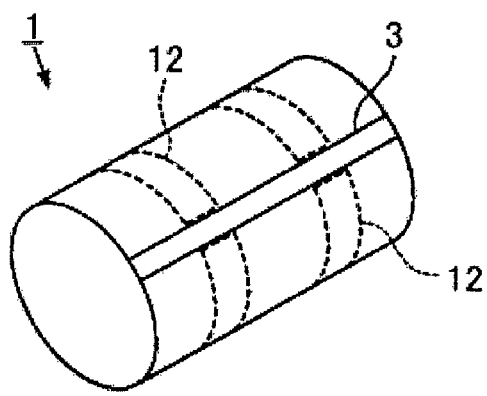
FIGS. 10A and 10B are perspective views illustrating deformation of a design due to deformation of a cover rubber layer in the third embodiment.
Figure 10B:
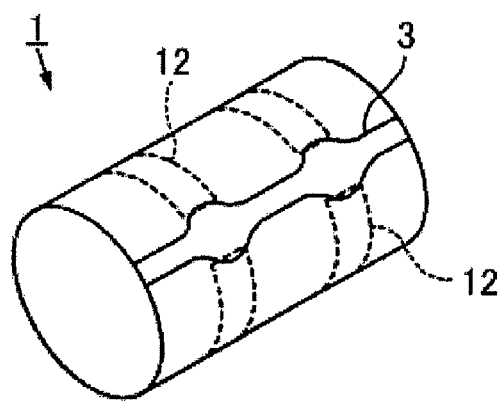

As a result of such a configuration, the portion 13 sandwiched by opposite ends of the constraining layers 12 is pulled to both sides and deforms along with the swelling of the cover rubber layer 10. Due to this deformation, a portion of the design 3 provided on the outer surface deforms from the normal state illustrated in FIG. 10A to indicate a state of fluid leakage as illustrated in FIG. 10B. Thereby, external visual detection of fluid leakage can be carried out easily. Note that in order to effectively deform the design 3, preferably at least a portion of the design 3 is configured so as to pass over the portion 13 that is sandwiched between opposite ends of the constraining layers 12.

In each of the embodiments described above, the hose axial direction position of the cover rubber layer 10 in which the sliding-surface layer 11 and the constraining layer 12 are embedded is not particularly limited. However, the cover rubber layer 10 is preferably provided in a central region of the hose body 1 because many reinforcing layers are disposed in the vicinity of the ends of the hose body 1 (within about 3,000 mm from the ends of the splicing fittings) for the purpose of reinforcing the ends.

The design 3 is preferably formed so as to be raised from the outer surface of the hose body 1, thus enabling confirmation by touch so as to accommodate cases where visual recognition of the design 3 is difficult such as when under night-time or poor weather conditions. Alternatively, as other means, a pouch-like film holding colored powder such as water soluble food coloring or the like can be disposed at depth that is 1 to 2 mm from the outer surface of the cover rubber layer 10 at a location where the twisting deformation caused by the pressure of the leaked fluid occurs, particularly at the portion 13 sandwiched between the opposite ends of the constraining layers 12. As a result of such a configuration, when the cover rubber layer 10 deforms greatly and fails, the colored powder will be expelled out of the cover rubber layer 10 and, therefore, even in cases where visual recognition of the design 3 is difficult, fluid leakage can be easily detected.

Furthermore, even in cases where a conventional hose having a complicated structure is used (e.g. see Patent Document 1 and the like), because the sliding-surface layer 11 and the constraining layer 12 are embedded sequentially from the inner side of a portion of the cover rubber layer 10 in the hose circumferential direction, external visual detection of fluid leakage can be carried out easily. As a result, detection accuracy of failures of the reinforcing layer can be improved.

Applications of the hose for transporting fluids of the present invention are not particularly limited. However, the hose for transporting fluids of the present invention can be preferably used as a large diameter hose for transporting fluids and, particularly, can be suitably used as a marine hose for transporting oil between an offshore tanker and a land-based storage tank or the like.

What is claimed is:

1. A hose for transporting fluids in which a plurality of reinforcing layers is disposed between an inner surface rubber layer and a cover rubber layer, a visible design continuous in a hose axial direction being provided on an outer surface of the cover rubber layer, the hose for transporting fluids comprising:
    a sliding-surface layer that is adjacent to the cover rubber layer, that is embedded at least partially in the hose axial direction in the cover rubber layer and that is non-adhesive with respect to the cover rubber layer; and
    a constraining layer that is adjacent to and embedded in the cover rubber layer in a state in which opposite ends in a longitudinal direction of the constraining layer are not in contact with one another, the constraining layer being wound partially in a hose circumferential direction on an outer side of the sliding-surface layer and being adhesive with respect to the cover rubber layer.

2. The hose for transporting fluids according to claim 1, wherein the constraining layer is embedded so as to be wound within a range of ⅓ or more and ½ or less of a length of an entire circumference of the hose.

3. The hose for transporting fluids according to claim 2, wherein a plurality of the constraining layers is disposed intermittently in the hose axial direction and winding positions in the hose circumferential direction of the constraining layers are configured so that adjacent constraining layers are on sides opposite each other in the hose circumferential direction.

4. The hose for transporting fluids according to claim 1, wherein the constraining layer is wound in a spiral manner.

5. The hose for transporting fluids according to claim 1, wherein the constraining layer is disposed so as to be bisected in a longitudinal direction and these constraining layers are symmetrical around a hose center.

6. The hose for transporting fluids according to claim 5, wherein the sliding-surface layer comprises a polyester film.

7. The hose for transporting fluids according to claim 6, wherein the constraining layer comprises a plurality of organic fiber cords aligned in the hose circumferential direction.

8. The hose for transporting fluids according to claim 7, wherein the hose is a marine hose for transporting oil.

9. The hose for transporting fluids according to claim 1, wherein a plurality of the constraining layers is disposed intermittently in the hose axial direction and winding positions in the hose circumferential direction of the constraining layers are configured so that adjacent constraining layers are on sides opposite each other in the hose circumferential direction.

10. The hose for transporting fluids according to claim 1, wherein the sliding-surface layer comprises a polyester film.

11. The hose for transporting fluids according to claim 1, wherein the constraining layer comprises a plurality of organic fiber cords aligned in the hose circumferential direction.

12. The hose for transporting fluids according to claim 1, wherein the hose is a marine hose for transporting oil.

13. The hose for transporting fluids according to claim 2, wherein the sliding-surface layer comprises a polyester film.

14. The hose for transporting fluids according to claim 2, wherein the constraining layer comprises a plurality of organic fiber cords aligned in the hose circumferential direction.

15. The hose for transporting fluids according to claim 2, wherein the hose is a marine hose for transporting oil.

16. The hose for transporting fluids according to claim 3, wherein the sliding-surface layer comprises a polyester film.

17. The hose for transporting fluids according to claim 3, wherein the constraining layer comprises a plurality of organic fiber cords aligned in the hose circumferential direction.

18. The hose for transporting fluids according to claim 3, wherein the hose is a marine hose for transporting oil.

* * * * *